United States Patent [19]

Pelczarski et al.

[11] 3,917,795

[45] Nov. 4, 1975

[54] METHOD OF TREATING COAL REFUSE

[75] Inventors: Eugene A. Pelczarski; James A. Karnavas; Paul J. La Rosa, all of Pittsburgh, Pa.

[73] Assignee: Black Sivalls & Bryson, Inc., Houston, Tex.

[22] Filed: Dec. 13, 1972

[21] Appl. No.: 314,615

Related U.S. Application Data

[63] Continuation-in-part of Ser. No. 93,723, Nov. 30, 1970, abandoned.

[52] U.S. Cl. ............... 423/168; 423/431; 423/563; 423/573
[51] Int. Cl.² C01F 11/18; C22B 1/11; C01B 17/06
[58] Field of Search .......... 423/153, 154, 168, 175, 423/430, 431, 432, 571, 574, 632, 633, 650, 572, 573, 563; 75/4, 5, 6

[56] References Cited
UNITED STATES PATENTS

| | | | |
|---|---|---|---|
| 1,862,899 | 6/1932 | Lenander | 423/572 |
| 2,995,438 | 8/1961 | Subervie et al. | 75/5 |
| 3,174,846 | 3/1965 | Brisse et al. | 75/4 |
| 3,249,402 | 5/1966 | Smyers et al. | 423/572 |
| 3,333,951 | 8/1967 | Ban | 75/5 X |
| 3,402,998 | 9/1968 | Squires | 423/563 |
| 3,526,478 | 9/1970 | Pelczarski et al. | 423/650 |
| 3,567,377 | 3/1971 | LeFrancois et al. | 423/573 |
| 3,599,610 | 8/1971 | Spector | 110/31 X |
| 3,625,164 | 12/1971 | Spector | 423/168 X |

FOREIGN PATENTS OR APPLICATIONS

| | | | |
|---|---|---|---|
| 829,844 | 3/1960 | United Kingdom | 423/571 |
| 436,443 | 10/1935 | United Kingdom | 423/175 |

*Primary Examiner*—Oscar R. Vertiz
*Assistant Examiner*—Gary P. Straub
*Attorney, Agent, or Firm*—C. Clark Dougherty, Jr.

[57] ABSTRACT

The present invention relates to a method of treating coal refuse containing pyrites and ash to produce usable products therefrom. The coal refuse is mixed with lime or limestone, formed into pellets and heated to form pellets containing calcium sulfide. The pellets are then reacted with carbon dioxide and water to form hydrogen sulfide and a calcium carbonate bonded coherent product which may be used for a variety of commercial purposes. The hydrogen sulfide produced in the reaction is converted to saleable elemental sulfur.

8 Claims, 3 Drawing Figures

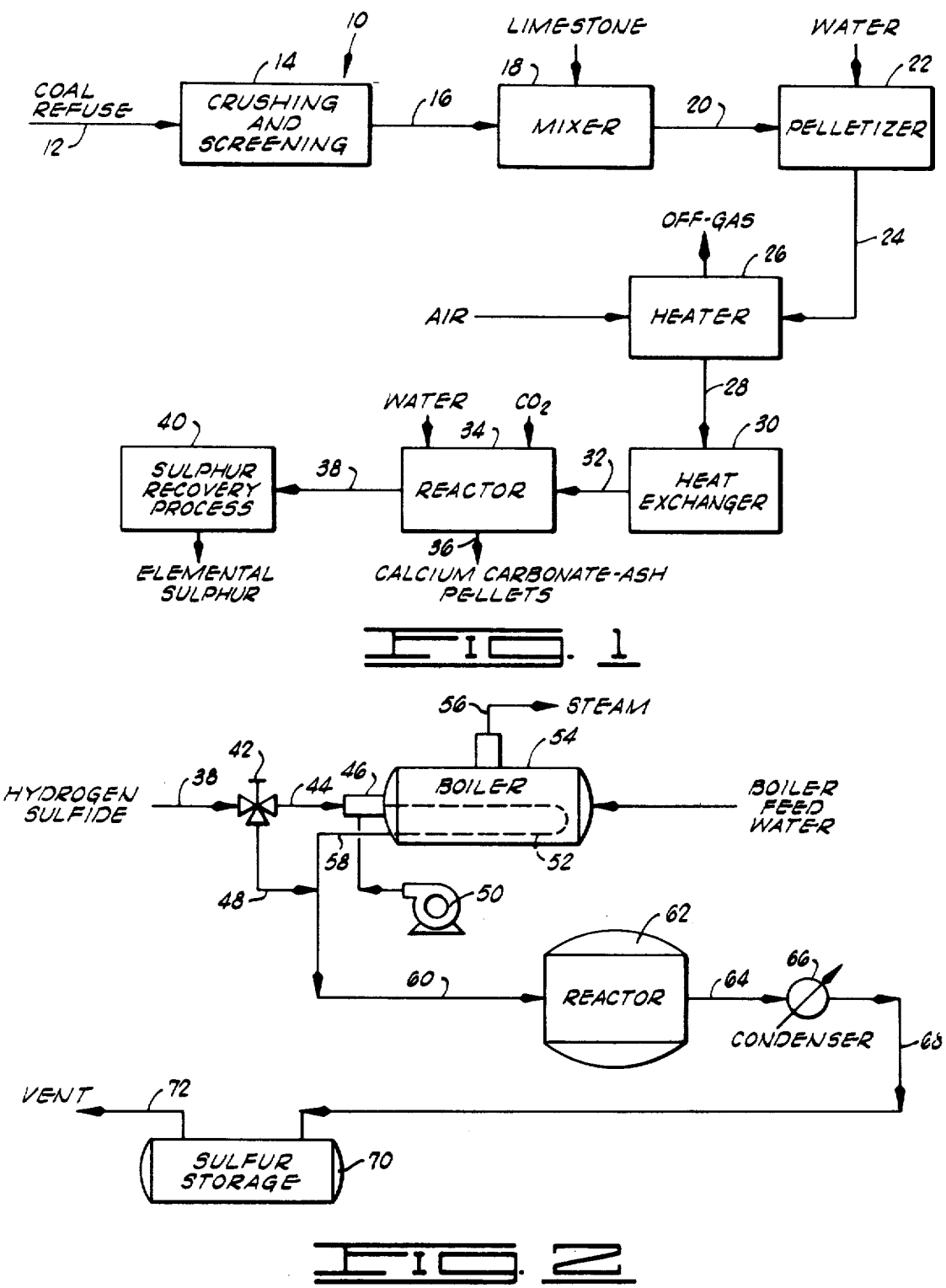

METHOD OF TREATING COAL REFUSE

CROSS-REFERENCE TO RELATED APPLICATION

This application is a continuation-in-part of application Ser. No. 93,723 filed Nov. 30, 1970, now abondoned.

BACKGROUND OF THE INVENTION

1. Field of the Invention

The present invention relates generally to methods of treating coal refuse, and more particularly, but not by way of limitation, to methods of treating coal refuse containing pyrites wherein the refuse is converted into a carbonate bonded coherent product and elemental sulfur.

2. Description of the Prior Art

During the preparation of coal for commercial use, coal refuse is produced which has a high ash (incombustible residue) and pyrites (various metallic sulfide compounds such as iron sulfide, copper sulfide, tin sulfide, etc.) content and a relatively low heating value. Heretofore, coal refuse has had no significant commercial usage and has been discarded in piles near the coal preparation plants. These discarded piles of coal refuse are exposed to the atmosphere, and as a result, are prime sources of acid water pollution. As rainfall percolates through a pile of coal refuse and permeates the refuse material, pyrites contained in the refuse material react with the rainfall and oxygen from the atmosphere to form, among other things, sulfuric acid and iron sulfate. These oxidation products are readily dissolved by rain water and are carried to nearby streams and ponds. Streams and ponds polluted by sulfuric acid and other pyrite oxidation products cannot support desirable forms of life, and as a consequence, are highly undesirable.

Several methods have been proposed for rendering a coal refuse pile impervious to atmospheric moisture. For example, it has been proposed to place a blanket of clay approximately three inches to four inches deep on the coal refuse pile. While this technique would make the coal refuse pile relatively impervious to water percolation, it has been estimated that placing such clay blankets on coal refuse piles would cost as much as $800 per acre. Another technique that has been proposed is to place plastic liners on the coal refuse piles to prevent water percolation. However, it has been estimated that the placing of such plastic liners would cost as much as $4000 per acre. In addition, plastic liners would be subject to severe maintenance problems.

By the present invention, a method of treating presently existing coal refuse piles and future coal refuse production is provided wherein the coal refuse material may be economically converted to usable products thereby eliminating coal refuse piles and the water pollution resulting therefrom.

SUMMARY OF THE INVENTION

The present invention relates to a method of treating coal refuse containing ash and pyrites comprising the steps of mixing the coal refuse with limestone, agglomerating the coal refuse-limestone mixture into pellets, heating the coal refuse-limestone pellets so that pyrites contained in the coal refuse react with lime thereby converting the pellets to mixtures of calcium sulfide, metallic oxide compounds and ash, and then reacting the pellets with carbon dioxide and water to form a coherent calcium carbonate bonded product and hydrogen sulfide.

It is, therefore, a general object of the present invention to provide a method of treating coal refuse.

A further object of the present invention is the provision of a method of treating coal refuse wherein a pelletized coherent calcium carbonate bonded product is produced.

Still a further object of the present invention is the provision of a method of treating coal refuse wherein elemental sulfur is produced which may be sold commercially.

Other and further objects, features and advantages will be apparent from the following detailed description given for the purpose of disclosure and taken in conjunction with the accompanying drawings.

BRIEF DESCRIPTION OF THE DRAWINGS

FIG. 1 is a diagrammatic illustration of a system for carrying out the method of the present invention, FIG. 2 is a diagrammatic view of a system for carrying out one sulfur recovery process which may be used in conjunction with the present invention.

DESCRIPTION OF THE PREFERRED EMBODIMENTS

Figure 3:
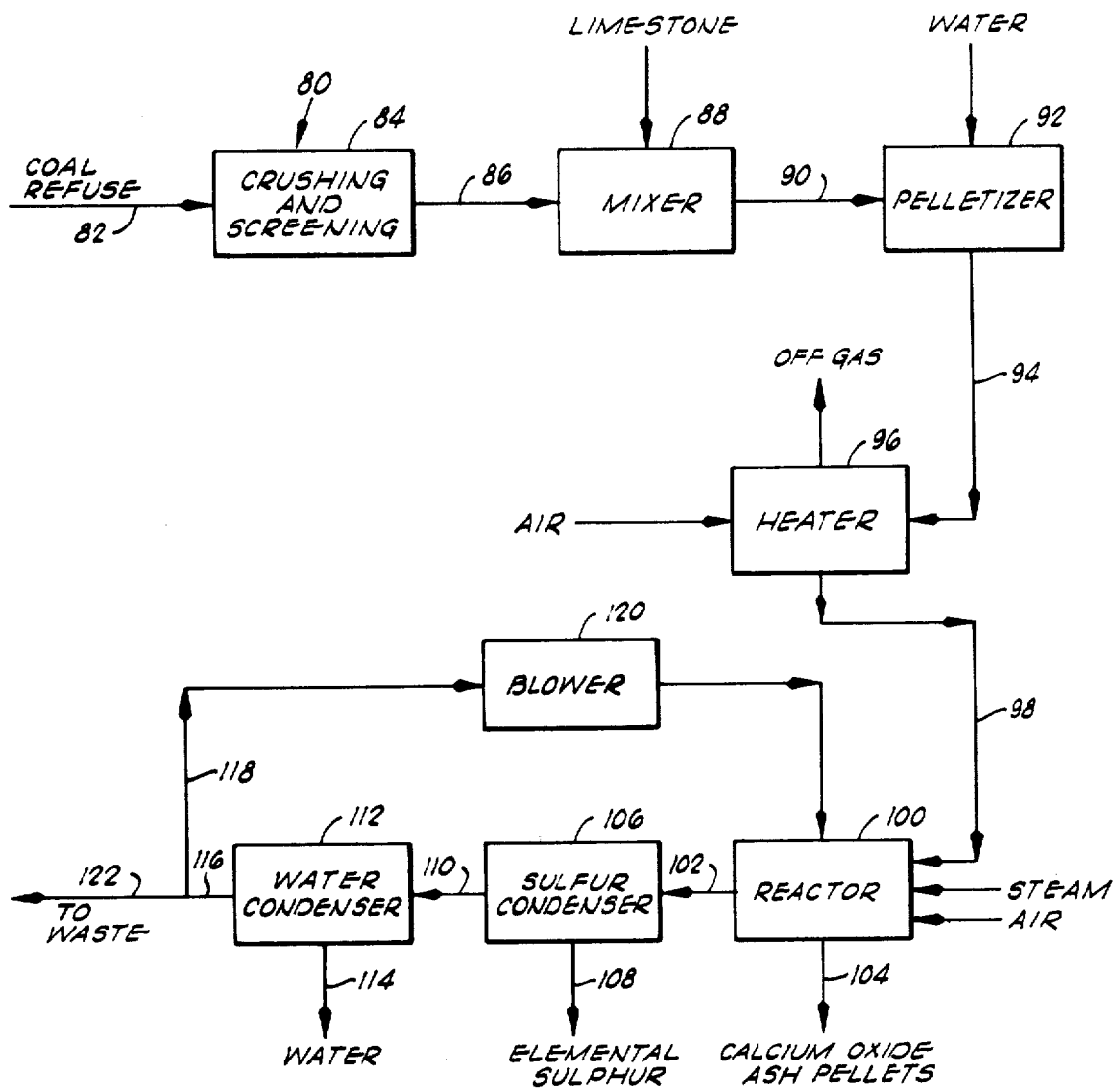
FIG. 3 is a diagrammatic illustration of an alternate system for carrying out the method of the present invention.

Referring particularly to FIG. 1, a system for carrying out the method of the present invention is illustrated and generally designated by the numeral 10. A continuous quantity of coal refuse containing ash and pyrites from an existing pile thereof, or directly from a coal processing plant, is transferred by means of a conveyor 12 to a conventional solids crushing and screening system 14 wherein the coal refuse is particulated to a maximum particle size of from about one-half inch in diameter to about 100 mesh (U.S. Sieve Series). The particulated coal refuse is conducted from the crushing and screening apparatus 14 by means of a conveyor 16 to a conventional mixing apparatus 18 where is is mixed with crushed limestone. The term "limestone" is used herein to mean either lime (calcium oxide) or limestone (calcium carbonate). If limestone is used it is converted to lime when heated as described further hereinbelow. The use of limestone as a raw material is preferred in that it is generally less expensive than pure lime.

The mixing apparatus 18 may be a muller, pugmill, or other conventional commercial mixer which will bring about intimate mixing of the limestone with the particulated coal refuse. From the mixer apparatus 18, the coal refuse-limestone mixture is transferred by means of a conveyor 20 to a conventional pelletizer apparatus 22. The pelletizer apparatus 22 may be a rotating drum, an inclined rotating disc or any other conventional commercial apparatus which will cause the coal refuse-linestone mixture to be agglomerated into more or less spherical pellets or clusters. As will be understood by those skilled in the art, water may be added to the pelletizer apparatus 22 in order to facilitate the pelletizing of the coal refuse-limestone mixture. Further, other techniques for agglomerating the coal refuse-limestone mixture may be used in lieu of pelletizing, such as briquetting.

From the pelletizer apparatus 22 the coal refuselimestone pellets are transferred by way of conveyor 24 to the heating apparatus 26. The heating apparatus 26 may be a vertical shaft furnace, a rotary kiln, a fired-grate similar to a sintering machine or any other suitable reactor for heating the coal refuse-limestone pellets to a temperature of from about 1600° to about 2,800°F. When limestone is used, a temperature of at least 1,600°F is required to bring about calcining of the limestone, which reaction may be represented by the equation:

$$CaCO_3 \rightarrow CaO + CO_2$$

In order to efficiently from calcium sulfide, the coal refuse-limestone pellets should be heated to a temperature as high as possible without causing a softening or melting of the mixture. This maximum temperature depends on the composition of the coal refuse but generally occurs at from about 2,300° to about 2,800°F.

Due to the heating of the coal refuse-limestone pellets, pyrites (metallic sulfide compounds) contained in the coal refuse react with lime to form metallic oxide compounds and calcium sulfide. This reaction may be represented in simplified form as follows:

CaO + metallic sulfides → metallic oxides + CaS

The energy requirements for the above reactions will normally be supplied from the burning of the carbonaceous compounds contained in the coal refuse-lime pellets; however, if additional energy is required for the heating apparatus 26 a portion of the particulated coal refuse exiting from the crushing and screening apparatus 14 may be combusted with air in the heating apparatus 26.

The resulting pellets formed of calcium sulfide, metallic oxide compounds and ash are removed from the heating apparatus 26 by means of a conveyor 28 and transferred to a conventional heat exchanger apparatus 30 wherein the pellets are cooled. The heat exchanger apparatus 30 may be a part of the heating apparatus 26 or a separate air cooler wherein heat is exchanged between air and the solid pellets in order to cool the pellets to a temperature of about 200°F. From the heat exchanger apparatus 30 the coal pellets are conveyed by conveyor 32 to a continuous reactor 34 wherein the pellets are contacted with carbon dioxide (which may be the off-gas from the heater 26) and water. The carbon dioxide and water react with the calcium sulfide contained in the pellets to form calcium carbonate and hydrogen sulfide. This reaction may be written as follows:

$$CaS + H_2O + CO_2 \rightarrow CaCO_3 + H_2S$$

The reactor 34 may be a rotary drum or vertical column through which carbon dioxide is caused to flow in contact with the pellets which have been wetted with water. The wetting of the pellets may take place in the heat exchanger 30 thereby facilitating the cooling of the pellets. An alternate technique which may be employed for both cooling and reacting the pellets is to pass the pellets from the heat exchanger 30 directly into a large tank containing carbonated water. A continuous stream of water fed to the tank is contacted with flue gases from the heating apparatus 26 thereby carbonating the water, and at the same time, scrubbing the flue gases.

The conversion of the calcium sulfide contained in the pellets to calcium carbonate causes the pellets to be bonded into coherent structures. The pellets formed in the reactor 24 are similar in characteristics to stone or rock and may be used for a variety of commercial purpose such as aggregate for concrete, etc. The pellets are removed from the reactor 34 by means of a conveyor 36.

Hydrogen sulfide produced in the reactor 34 is conducted by a conduit 38 to a conventional sulfur recovery process 40 wherein elemental sulfur is produced therefrom. Many processes for the recovery of elemental sulfur from hydrogen sulfide have been developed. Of these, a process known at the "Claus" process has met with the greatest commercial success. The Claus process is preferred for use in the present invention, and a preferred system for carrying out the Claus process is illustrated in diagrammatic form in FIG. 2. Referring to FIG. 2, the hydrogen sulfide from the conduit 38 enters a three-way valve 42 which is adjusted so that approximately one-third of the hydrogen sulfide passes through a conduit 44 into a burner 46 and approximately two-thirds passes into a conduit 48. The burner 46 is supplied with air by a pump 50, and the hydrogen sulfide entering the burner 46 is combusted to form sulfur dioxide. The sulfur dioxide thus formed passes through a conduit 52 which is disposed within a boiler 54. Heat given off by the combustion reaction is transferred through the walls of the conduit 52 into a body of water contained within the boiler 54 thereby generating steam. The generated steam passes out of the boiler 54 through a conduit 56, and may be used as a source of heat in the system 10 described above as shown in FIG. 1. After passing through the conduit 52, the sulfur dioxide passes into a conduit 58 and combines with the hydrogen sulfide passing through a conduit 48. The combined stream then passes through a conduit 60 into a reactor 62. The reactor 62 contains a catalyst such as bauxite, which has the effect of accelerating a reaction between the sulfur dioxide and hydrogen sulfide to form elemental sulfur vapor. This reaction is well known and may be controlled to produce a high yield of elemental sulfur. The thus formed elemental sulfur passes out of the reactor 62 through a conduit 64 into a condenser 66 wherein it is condensed. The condenser 66 may utilize water or air as the cooling media, and the condensed sulfur passes from the condenser 66 through a conduit 68 into a sulfur storage tank 70. Non-condensible gases generated in the process are vented from the sulfur storage tank 70 through a vent 72.

Turning now to FIG. 3, an alternate system for carrying out the method of the present invention is illustrated and generally designated by the numeral 80. The system 80 is identical to the system 10 illustrated in FIG. 1 through the step of heating the coal refuselimestone pellets to form calcium sulfide-metallic oxide-ash pellets. That is, coal refuse is conducted by way of a conveyor 82 to a conventional crushing and screening apparatus 84 wherein the coal refuse is particulated. The particulated coal refuse is conducted from the crushing and screening apparatus 84 by a conveyor 86 to a conventional mixing apparatus 88 wherein the coal refuse is mixed with crushed limestone or lime. From the mixer apparatus 88 the coal refuse-limestone mixture is conducted by conveyor 90 to a pelletizer apparatus 92, wherein the coal refuse-limestone mixture is formed into pellets. The pellets are conducted by conveyor 94 to a heater apparatus 96 wherein the pellets are converted to mixtures of calcium sulfide, metallic oxide compounds and ash.

By the alternate system shown in FIG. 3, the pellets are conducted from the heater 96 directly to a reactor 100 by way of a conveyor 98. While within the reactor 100 the calcium sulfide-ash pellets are intimately contacted with steam and a controlled quantity of air. Reactor 100 may be a vertical column, a rotary kiln, or any other suitable reactor apparatus for bringing about intimate contact between the pellets and the steam and air passing therethrough. In the reactor 100 steam and air react with the calcium sulfide pellets to form elemental sulfur. The complex reactions that occur may be described in simplified form as follows:

Steam reacts with the calcium sulfide in the pellets to form hydrogen sulfide and calcium oxide:

$$CaS + H_2O \rightarrow H_2S + CaO$$

A portion of the hydrogen sulfide thus formed reacts with oxygen from the air to form sulfur dioxide which in turn reacts with additional hydrogen sulfide to form elemental sulfur vapor:

$$3H_2S + 1\tfrac{1}{2} O_2 \rightarrow SO_2 + 2H_2S + H_2O$$

$$2H_2S + SO_2 \rightarrow 3S + 2H_2O$$

The sulfur vapor as well as other gases formed in the reactor 100 pass from the reactor by way of conduit 102. The reacted pellets contain calcium oxide, ash and other compounds. The pellets are conveyed out of the reactor 100 by way of conveyor 104. The elemental sulfur vapor, steam and other gaseous compounds formed in the reactor 100 pass through conduit 102 into sulfur condenser 106 which may be a conventional water or air cooled heat exchanger. The elemental sulfur vapor is condensed and removed from the condenser 106 by way of conduit 108. The non-condensed gases pass from condenser 106 by way of conduit 110 into a second air or water cooled condenser 112 wherein water contained in the gases is condensed and removed by way of conduit 114. The remaining uncondensed gases are removed from condenser 112 by way of a conduit 116. A portion of the uncondensed gases is recycled to the reactor 100 by way of conduit 118 and conventional blower 120 and excess gases not recycled are passed by way of conduit 122 to a point of further processing or to waste.

The pellets containing calcium oxide removed from the reactor 100 may be further processed to form calcium carbonate bonded ash pellets by reaction with carbon dioxide if desired.

In carrying out the method of the present invention, a minimum of three pounds of lime or limestone per pound of sulfur contained in the coal refuse to be treated is required for complete conversion of the sulfur to calcium sulfide. As stated above, it is desirable to heat the coal refuse-limestone pellets to as high a temperature as possible so that the most efficient conversion of iron and other metallic sulfides to calcium sulfide is obtained. However, the maximum temperature to which the coal refuse-limestone mixture may be heated is limited by the melting point of the mixture which will normally be in the range of from about 2,300°F to about 2,800°F.

In most cases, the heat energy requirement required for carrying out the method of the present invention may be supplied by the combustion of the carbon content of a portion of the incoming coal refuse. Accordingly, the temperature of the heater will be controlled by regulating the amount of excess air in the combustion reaction. In the event the heating value of the coal refuse processed is insufficient to maintain required temperature levels, supplementary fuel may be required.

The minimum quantity of carbon dioxide required in reactor 34 of the system of FIG. 1 to completely convert the calcium sulfide contained in the pellets to calcium carbonate is approximately 1.5 pounds of carbon dioxide per pound of sulfur contained in the coal refuse. Excess carbon dioxide is recommended to accelerate the reaction. Water is required in the amount of 0.6 pounds of water per pound of sulfur as a minimum.

In carrying out the method of the present invention in the system illustrated in FIG. 3, for complete conversion a minimum of steam must be added to the reactor 100 in an amount of 0.6 pounds of steam per pound of sulfur contained in the coal refuse, and air is required in the amount of approximately 2 pounds per pound of sulfur.

Thus, by the present invention, a method of treating coal refuse is provided whereby usable and saleable products are produced. The calcium carbonate bonded pellets produced may be used for a variety of industrial purposes. For example, the pellets may be used for road building, or as a coarse aggregate in concrete. However, if necessary, the pellets may be disposed of in piles exposed to the atmosphere without the formation of acid water.

The elemental sulfur produced may be sold commercially thereby generating a revenue which will offset all or part of the cost for carrying out the method of the present invention.

The present invention, therefore, is well adapted to carry out the objects and attain the ends and advantages mentioned as well as those inherent therein. While presently preferred embodiments of the invention are given for the purpose of disclosure, numerous changes can be made which will readily suggest themselves to those skilled in the art and which are encompassed in the spirit of the invention and the scope of the appended claims.

What is claimed is:

1. A method of treating relatively low heating value coal refuse containing a high ash content and sulfur in the form of pyrites comprising the steps of:

mixing the coal refuse with limestone in an amount of at least about 3 pounds of limestone per pound of sulfur contained in said coal refuse;

agglomerating the coal refuse-limestone mixture into pellets;

heating the coal refuse-limestone pellets to a temperature in the range of from about 1,600°F to about 2,800°F without melting said pellets so that pyrites contained in the coal refuse react with lime to form metallic oxide compounds and calcium sulfide thereby converting the pellets to mixtures of calcium sulfide, metallic oxide compounds and ash; and reacting the calcium sulfide-metallic oxide-ash pellets with carbon dioxide and water to form a coherent calcium carbonate bonded pellet product and hydrogen sulfide.

2. The method of claim 1 which is further characterized to include the step of particulating the coal refuse to a particle size of from about one-half inch in diameter to about 100 mesh (U.S. Sieve Series) prior to the step of mixing the coal refuse with limestone.

3. The method of claim 1 which is further characterized to include the step of converting the hydrogen sulfide to elemental sulfur.

4. The method of claim 3 wherein the step of converting the hydrogen sulfide to elemental sulfur comprises:
   combusting the hydrogen sulfide to convert a portion thereof to sulfur dioxide;
   reacting said sulfur dioxide with the remaining portion of hydrogen sulfide to form elemental sulfur vapor; and
   condensing the elemental sulfur vapor.

5. A method of treating relatively low heating value coal refuse containing sulfur in the form of pyrites and a high ash content, comprising the steps of:
   particulating the coal refuse to a particle size of from about one-half inch in diameter to about 100 mesh (U.S. Sieve Series);
   mixing the particulated coal refuse with crushed limestone in an amount of at least about 3 pounds of limestone per pound of sulfur contained in said coal refuse;
   pelletizing the mixture of coal refuse and limestone;
   heating the coal refuse-limestone pellets to a temperature in the range of from about 1,600° to about 2,800°F without melting said pellets so that the limestone and pyrites contained therein react to form metallic oxide compounds and calcium sulfide;
   cooling the resulting calcium sulfide-metallic oxide-ash pellets to a temperature of about 200°F; and
   reacting the resulting cooled pellets with carbon dioxide in an amount of at least about 1.5 pounds of carbon dioxide per pound of sulfur contained in said coal refuse and water in an amount of at least about 0.6 pounds of water per pound of sulfur contained in said coal refuse to form a pelletized calcium carbonate bonded product and hydrogen sulfide.

6. The method of claim 5 which is further characterized to include the step of converting the hydrogen sulfide to elemental sulfur.

7. A method of treating relatively low heating value coal refuse containing sulfur in the form of pyrites and a high ash content comprising the steps of:
   particulating the coal refuse to a particle size of from about one-half inch in diameter to about 100 mesh (U.S. Sieve Series);
   mixing the particulated coal refuse with crushed limestone in an amount of at least about 3 pounds limestone per pound of sulfur contained in said coal refuse;
   pelletizing the mixture of coal refuse and limestone;
   heating the coal refuse-limestone pellets to a temperature in the range of from about 1,600° to about 2,800°F without melting said pellets so that the limestone and pyrites contained therein react to form metallic oxide compounds and calcium sulfide;
   reacting the calcium sulfide-metallic oxide-ash pellets with steam in an amount of at least about 0.6 pounds of steam per pound of sulfur contained in the coal refuse and air in an amount of about 2 pounds of air per pound of sulfur contained in said coal refuse to form calcium oxide-metallic oxide-ash pellets and elemental sulfur vapor; and
   contacting the calcium oxide-metallic oxide-ash pellets with carbon dioxide to form a pelletized calcium carbonate bonded product.

8. The method of claim 7 which is further characterized to include the step of condensing said elemental sulfur vapor.

* * * * *